United States Patent [19]

van de Bult

[11] 4,439,792
[45] Mar. 27, 1984

[54] SWING ARM ARRANGEMENT FOR A MAGNETIC DISC STORAGE APPARATUS

[75] Inventor: Oelke van de Bult, The Hague, Netherlands

[73] Assignee: U.S. Philips Corporation, New York, N.Y.

[21] Appl. No.: 305,300

[22] Filed: Sep. 24, 1981

[30] Foreign Application Priority Data

May 22, 1981 [NL] Netherlands .......................... 8102524

[51] Int. Cl.³ .............................................. G11B 5/55
[52] U.S. Cl. .................................................... 360/106
[58] Field of Search .................................. 360/97–106; 369/40, 219, 198

[56] References Cited

U.S. PATENT DOCUMENTS

| 3,170,149 | 2/1965 | Koskie et al. | 360/106 |
| 4,209,813 | 6/1980 | Bryer | 360/105 |
| 4,346,416 | 8/1982 | Riggle et al. | 360/106 |

FOREIGN PATENT DOCUMENTS 1202408  8/1970  United Kingdom ................ 360/106

Primary Examiner—Aristotelis M. Psitos
Assistant Examiner—Kin C. Wong
Attorney, Agent, or Firm—Joseph P. Abate

[57] ABSTRACT

A swing arm arrangement includes at least one magnetic head provided on at least one swing arm of a magnetic disc store. The swing arm has a recess formed by walls whose facing portions cooperate with opposite portions of a single stop cam to limit the pivotal movements of the arm.

8 Claims, 6 Drawing Figures

SWING ARM ARRANGEMENT FOR A MAGNETIC DISC STORAGE APPARATUS

BACKGROUND OF THE INVENTION

The invention relates to a swing-arm arrangement for moving and positioning at least one magnetic head over at least one surface of at least one rotating rigid magnetic disc of a magnetic-disc storage apparatus for the storage and reproduction of data in digital form, which arrangement comprises: a stationary frame; at least one swing arm which is pivotable about a pivotal axis between a first and a second position, the swing arms, if there are a plurality of such arms, being spaced from each other and being stacked to form an assembly of swing arms, which assembly is pivotable about said pivotal axis; at least one magnetic head on one end of each swing arm; and first and second stop means connected to the frame and cooperating with the swing arm or swing-arm assembly, for limiting the pivotal movements of the swing arm or swing-arm assembly between said first and second positions.

Magnetic disc storage equipment comprising one or a plurality of rigid magnetic discs, which each serve for the storage and reproduction of data in digital form on at least one side and generally on both sides, is employed on a large scale as peripheral equipment for data processing apparatus such as computers.

The magnetic discs rotate with a high speed, for example, 3600 revolutions per minute, and the magnetic heads, which are secured to the ends of the carrying-arm arrangements, are moved over the surfaces of the magnetic discs to locations which are preselected by the data processing apparatus in order to store data in a specific track on the magnetic disc or in order to reproduce data from said track. The carrying arm arrangements comprise carrying arms which are either linearly movable in a radial direction or which are pivotable about a pivotal axis parallel to the axis of rotation of the magnetic discs. The invention relates to a carrying arm arrangement of the last-mentioned type, herein referred to as a swing-arm arrangement. The magnetic heads should be moved as fast as possible over the magnetic discs in order to minimize the time required for locating the correct track and storing or reproducing the data. The magnetic discs are manufactured with an extremely high degree of flatness. The magnetic heads floating on a very thin film of air very close to the surface of the magnetic discs.

In many cases, each magnetic head is secured to a resilient magnetic head carrier in order to obtain the mobility which permits the magnetic head to float on the air film and in order to provide a resilient load which exerts an accurately defined pressure on said head. In order to minimize the external dimensions of magnetic-disc storage equipment, the various manufacturers attempt to arrange the magnetic discs as close as possible to each other. The carrying-arm arrangements, especially when they are interposed between two magnetic discs, should, therefore, be as flat as possible and move as close as possible to the magnetic-disc surface. It is obvious that the carrying arm should never touch the magnetic disc surface because this would render the magnetic disc unserviceable. Carrying-arm arrangements for magnetic-disc storage equipment should, therefore, be manufactured with the necessary precision.

A swing-arm arrangement of the type mentioned in the opening paragraph is known from U.S. Pat. No. 4,150,407. The known swing arm arrangement comprises one or more aluminium swing arms in the form of bifurcated levers which are pivotable about a pivotal axis disposed between two ends. Arranged near the one end of each swing arm is a magnetic head unit comprising the magnetic head and a resilient magnetic head carrier. The carrier is rigidly connected to the carrying arm. On the other end of the swing, arm a control coil is arranged. Said coil belongs to electromagnetically and electrically controllable actuating means by means of which it is possible to impart a pivotal movement about the pivotal axis of the swing arm to said arm, so as to enable the magnetic head to be moved over the magnetic disc in a substantially radial direction.

In a known version comprising a plurality of swing arms, said arms are arranged above the spaced from one another and they are combined to form an assembly of swing arms which are pivotable about the pivotal axis. Each swing arm carries a separate flat control coil, so that these coils are also combined to form an assembly of control coils which are spaced from each other. The assembly of swing arms is journalled on a frame by means of a bearing arrangement which comprises two ball-bearings and a bearing pin on which the inner races of the ball bearing are fixed by suitable means so as to be axially spaced from each other. The outer races of the ball-bearings are fitted in a bearing housing which is screwed to the deck of the magnetic-disc storage apparatus. A compression spring between the outer races eliminates the axial bearing play. The control coils move in a permanent-magnetic stator. Said stator comprises a stator frame and a plurality of flat, axially magnetized permanent stator magnets which are connected to the stator frame and between which air gaps are formed for each flat control coil, so that each control coil is movable in an axial permanent magnetic field within an air gap formed between permanent stator magnets. On each side of the stator, iron stator end plates are arranged which extend over the interposed control coils and stator magnets and on which the outermost stator magnets are mounted, so that the axial permanent magnetic stator fields are closed via the iron stator end plates. Each control coil comprises turns of an electrically conductive material wound onto a platics coil former which forms one structural unit with the control coil by means of a synthetic resin. The control coils are connected to the swing arms by clamping and glueing on the ends of the swing arms which are remote from the magnetic heads.

A swing-arm arrangement of the type mentioned in the opening paragraph is also known from U.S. Pat. No. 4,196,456. This known swing-arm arrangement bears great resemblance to the previously mentioned known swing-arm arrangement, but the control coils are not arranged directly on the swing arms but are stacked on a bearing bush as separate units. The bearing pin is fixed.

SUMMARY OF THE INVENTION

It is an object of the present invention to provide a swing arm arrangement of the type mentioned in the opening paragraph, which comprises fewer parts and which is, therefore, of simpler construction and cheaper. Thus the swing-arm arrangement is particularly suitable for magnetic disc stores provided with magnetic discs of smaller diameter, for example, of the order of magnitude of 13 cm and smaller, in order to render such magnetic disc stores suitable for use on a larger scale.

It is a further object of the invention to provide a swing-arm arrangement which can readily be mounted into a magnetic-disc storage apparatus and which facilitates maintenance activities.

The invention is characterized in that the first and second stop means comprise opposite sides of a single stop and that at least one swing arm is formed with a recess whose wall comprises facing sides which each cooperate with one of the opposite sides of the single stop.

Thus, a swing-arm arrangement in accordance with the invention requires only one stop. Adjusting the travel of the swing arm is not necessary because this is defined by the dimensions of the stop and said recess.

The swing-arm arrangement moves the magnetic heads over the magnetic discs with high speed in a substantially diametrical direction. This means that comparatively large inertial forces are produced. In this respect, an embodiment of the invention is of interest which is characterized in that the stop is made of an elastic material.

Preferably, an embodiment of the invention is used which is characterized in that the stop is movable between an operating position and a maintenance position and that the distance between the opposite sides of the stop is smaller in the maintenance position than in the operating position, in order to pivot the swing arm or swing-arm assembly, for maintenance purposes, through such an extended range that each magnetic head is disposed adjacent the surface of a magnetic disc. This facilitates mounting of the swing-arm arrangement and maintenance operations. Indeed, it is essential that the vulnerable magnetic heads cannot inadvertently be moved beyond the surface of the magnetic disc or discs. However, during maintenance work, this should be possible in a rapid and easy manner.

An embodiment of the invention which functions easily is characterized in that the stop is eccentrically rotatable between the operating position and the maintenance position. Suitably, an embodiment is used which is characterized in that there is provided an elongate part which is connected to the frame, such as a spacer, which part is arranged between two frame portions, and that the stop comprises a stop cam which has a moderately tight fit on said elongate part and is made entirely of an elastic material.

BRIEF DESCRIPTION OF THE DRAWING

An embodiment of the invention will now be described in more detail with reference to the accompanying drawing, in which.

DESCRIPTION OF THE PREFERRED EMBODIMENTS

Figure 1:
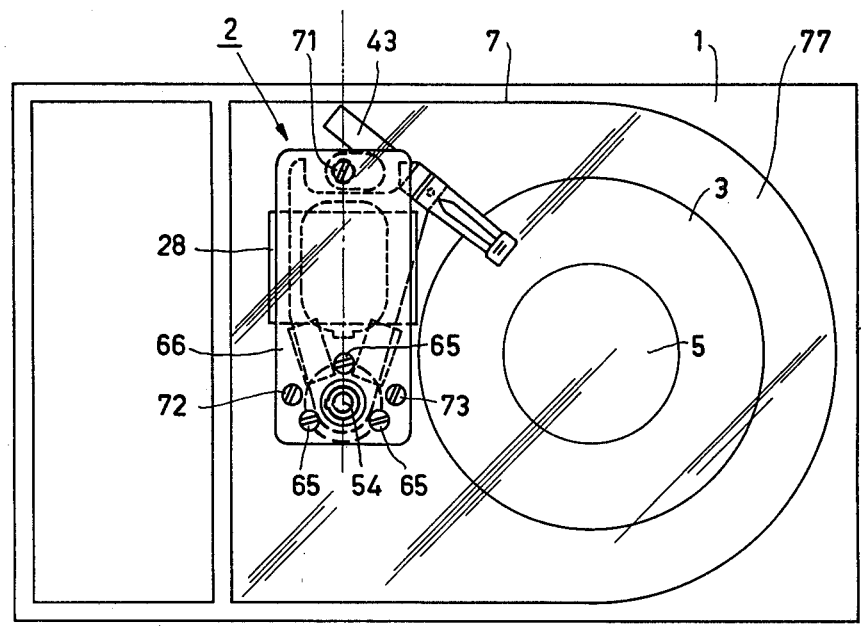
FIG. 1 is a plan view of a magnetic-disc storage apparatus.

The magnetic-disc storage apparatus comprises a frame 1 to which a swing-arm arrangement 2 is rigidly secured. Two rigid magnetic discs 3 and 4 are arranged coaxially on a common spindle 5 so as to be spaced from each other, and rotate about an axis of rotation 6. The swing-arm arrangement 2 and the magnetic discs 3 and 4 are covered by a plastics cover 7. Said cover protects the magnetic discs 3 and 4 against dust and other contaminatants. For the sake of brevity, those parts of the magnetic-disc storage apparatus which are irrelevant to the present invention are not described and are not shown in the drawing, except for a box-shaped unit 8 which accommodates the electronic circuitry necessary for the operation of the magnetic-disc storage apparatus.

The swing-arm arrangement in accordance with the invention will now be described in more detail with reference to FIG. 3. The swing-arm arrangement serves for moving and positioning four magnetic heads 9 to 12 over two rotating rigid magnetic discs 3 and 4. Said magnetic heads are spaced from each other by a distance corresponding to the spacing between the magnetic disc 3 and 4 and are, together, arranged on a single swing arm 14 which is pivotable about a pivotal axis 13. The magnetic heads are, together, mounted on a single mounting device 15 which is formed with the faces, recesses and threaded holes necessary for locating and mounting the magnetic heads on the swing arm. The mounting device 15 is rigidly connected to the swing arm 14 by glueing, using a method as proposed in the applicant's copending U.S. application No. 305, 313, filed Sept. 24, 1981 and herewith incorporated by reference.

Each of the magnetic heads 9 to 12 is arranged on a resilient magnetic-head carrier 9a to 12a, respectively, which, at its end, is provided with a fixing part 9b to 12b, respectively, which is equipped with a fixing bush 9c to 12c, respectively. The mounting device 15 is formed with a through-hole 16 in which the fixing bushes fit with some clearance. In order to secure a magnetic-head unit (comprising a magnetic head, the elastic head carrier and the fixing part) to the mounting device 15, a slightly oversized ball is forced through the relevant fixing bush, so that the clearance between the fixing bush and the through-hole is eliminated. Such magnetic-head units are commercially available.

The center of gravity of the assembly comprising the mounting device 15 and the magnetic heads 9 to 12 arranged thereon is disposed substantially in the plane of pivoting of the swing arm 14. This also applies to the other parts of the magnetic-head units. However, these parts have a substantially lower mass than the magnetic heads and the mounting device.

The mounting device 15 comprises a plurality of projections 17, 18 and 19 for mounting the magnetic heads 9 to 12 at regular distances from each other in such a way that the projections constitute a comb. The mounting device comprises a plurality of parts 20, 21 and 22 are detachably secured to each other and which each of which comprises a projection of the comb. The parts 20 and 22 are secured to the central part 21 by means of bolts 23 and 24. The part 21 is glued to the swing arm 14, using the previously mentioned method, before the magnetic heads 10 and 11 are connected to the projection 18 by means of the fixing bushes 10c and 11c. The magnetic heads 9 and 12 are connected to the projections 17 and 19 of the parts 20 and 22 before said parts are connected to the center part 21 by means of the bolts 23 and 24. This facilitates mounting of the vulnerable magnetic-head units on the mounting device 15.

Figure 2:
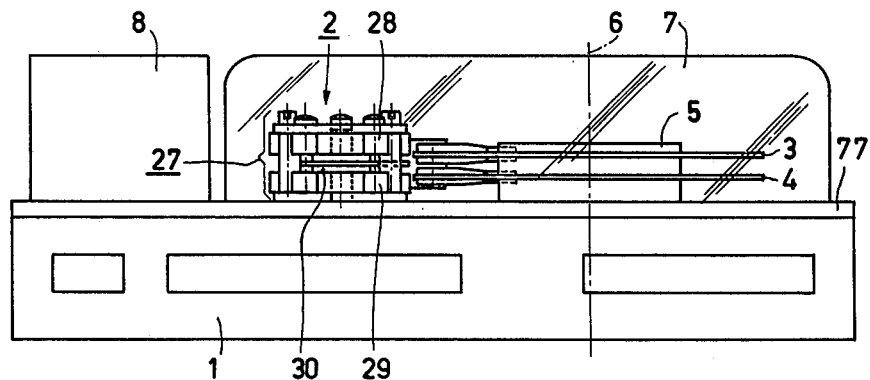
FIG. 2 is a side view of the magnetic-disc storage apparatus of FIG. 1.

The swing arm comprises a first end 25 and a second end 26. The magnetic heads 9 to 12 are connected to the swing arm near the first end 25. The swing-arm arrangement comprises a permanent magnetic stator 27 having flat permanent stator-magnets 28 and 29 which are spaced from each other and between which an air gap 30 is formed, see FIG. 2. In said air gap there is arranged a flat control coil 31 of an electrically conductive material. The coil is connected to the swing arm 14. The swing arm 14 is pivotably journalled by means of a bearing arrangement 32. The flat control coil 31 is arranged in a recess 33 of the swing arm 14. The swing arm has been die-cut from an aluminium sheet, the recess 33 being formed during the die-cutting operation; The bearing arrangement 32 is situated near the second end 26 of the swing arm and the control coil 31 is arranged between the first end 25 and the second end 26 of the swing arm.

The swing arm is manufactured from a single flat piece of sheet material and the flat control coil 31 has a thickness dimension which is substantially equal to the thickness dimension of the sheet material from which the swing arm is manufactured. The recess 33 in the swing arm has a shape which corresponds to the shape of the outer circumference of the control coil 31 so that said coil fits in said recess with clearance.

Figure 3:
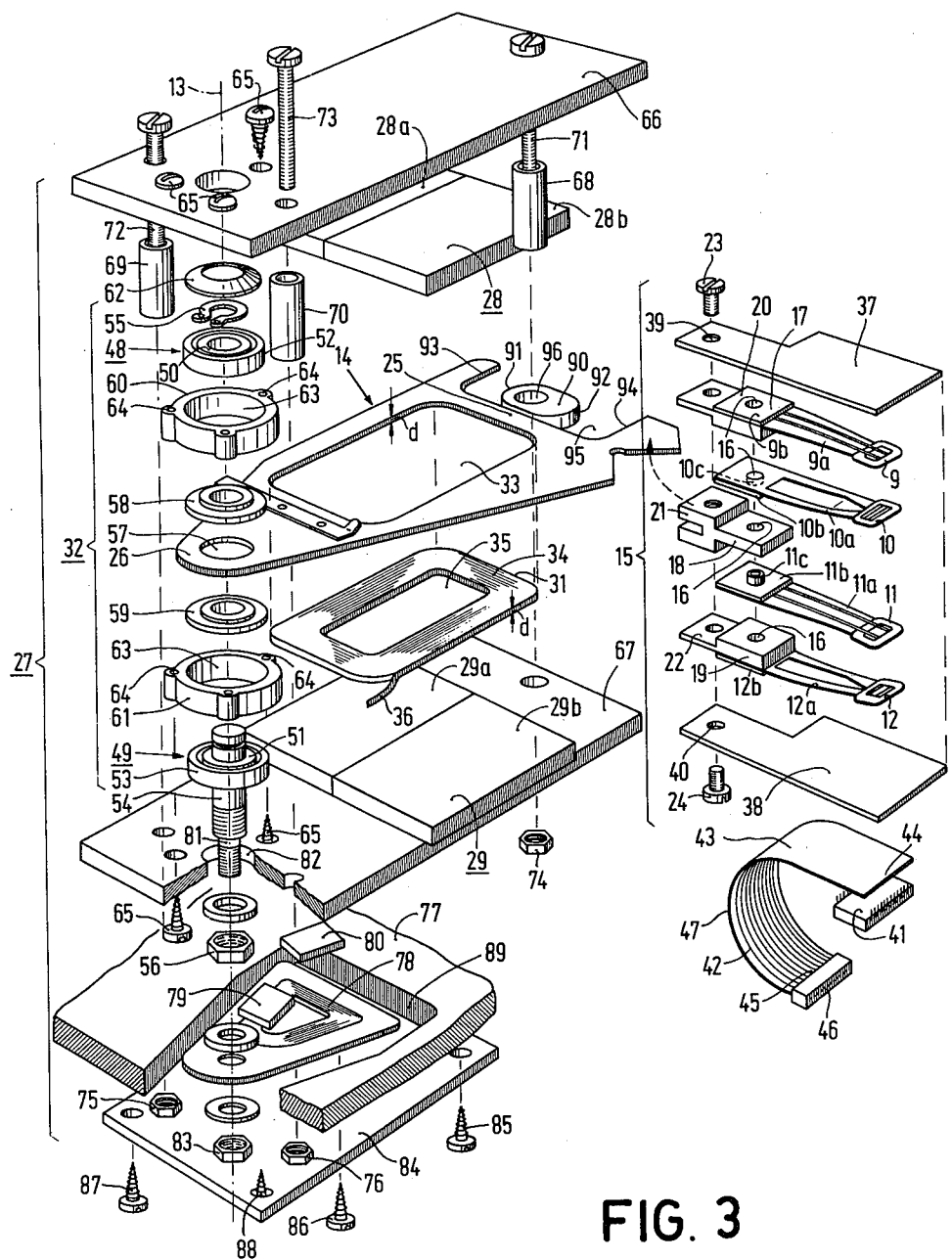
FIG. 3 is an exploded view of a swing arm arrangement as used in the magnetic-disc storage apparatus shown in FIGS. 1 and 2, and FIGS. 4–6 represent the swing arm of the swing-arm arrangement in different positions.

The control coil is glued in the swing arm 14 and is attached to the wall of the recess 33 by means of a film of glue which is not visible in FIG. 3. The control coil is situated in the plane of the swing arm so that the swing arm with the control coil glued therein constitutes a flat unit of substantially constant thickness. The turn 34 of the control coil are made of an electrically conductive material and are wound onto a central flat plastics coil former 35. The electrically conductive material is not formed by an elongate copper wire, as is customary for control coils, but by an elongate aluminium strip 36 having a width dimension equal to the thickness "d" of the coil and having a thickness dimension which is substantially smaller. The glue for connecting the control coil 31 to the wall of said recess 33 has been mixed with aluminium powder in order to ensure a satisfactory heat transfer between the coil and the sheet material of the swing arm.

The two outermost magnetic heads 9 and 12 of the stack of magnetic heads 9 to 12 are shielded from spurious magnetic fields by mu-metal shields 37 and 38 which extend at the outside beyond the respective magnetic heads and which are connected to the swing arm 14 via the mounting device 15. The shields are formed with openings 39 and 40, and together with the parts 20 and 22 of the mounting device 15, they are connected to the central part 21 of the mounting device by means of bolts 23 and 24 respectively. On the lower shield 38 an integrated semiconductor circuit 41 is mounted for processing signals from the magnetic heads 9 to 12. Thus, said signals can be amplified before they are applied to the signal processing sections of the magnetic-disc storage apparatus. The semiconductor circuit 41 is mounted on a flexible plastics strip 43 provided with electrically conductive tracks 42. The strip is secured to the shield 38 at a first end 44. Near a second end 45, the plastics strip is connected to a stationary connector on the frame 1 of the magnetic-disc storage apparatus via a multi-pole connector 46. Between said first and second ends 44 and 45, the plastics strip 43 comprises a freely movable portion 47 which does not impede the movements of the swing arm 14.

The bearing arrangement 32 for pivotably journalling the swing arm comprises a first ball bearing 48 and a second ball bearing 49 having inner races 50 and 51 and outer races 52 and 53, respectively. The two inner races 50 and 51 are fixed on a bearing pin 54, axially spaced from each other, by means of a circular clip 55 and a nut 56. The ball bearings 48 and 49 are located on both sides of the swing arm 14. The swing arm is formed with an opening 57 for the bearing pin 54. On each side of the swing arm, rings 58 and 59 are disposed which retain the swing arm between the inner races 50 and 51 for the ball bearings 48 and 49. The outer races 52 and 53 of the ball bearing engage with bearing-housing means which comprise a first and a first second bearing housing 60 and 61, respectively. Axial clearance between the outer races 52 and 53 of the ball bearings is eliminated in that they are axially loaded by means of pressure spring means in the form of a cup spring 62 which is disposed near the outer race 52 on top of the upper ball bearing 48. The ball bearings have sliding fits in the bearing housings 60 and 62 and the cup spring 62 urges the ball bearings axially towards each other. Each bearing housing comprises a length of extruded tube a central through-hole 63 for the outer races 52 and 53 of the two ball bearings 48 and 49 and three parallel through-holes 64 of smaller cross-section which are situated around the central hole 63. The bearing housing 60 and 61 are secured by means of self-tapping screws 65 which are fitted into said holes 64.

The permanent magnetic stator 27 comprises a stator frame with two iron stator end plates 66 and 67, one on each side of the stator, which stator end plates extend over the interposed control coil 31 and the stator magnets 28 and 29. Said magnets are glued onto the stator end plates. The stator magnets are axially magnetized in the direction of the pivotal axis 13 of the swing arm 14. The stator magnet 28 comprises two zones 28a and 28b which are oppositely polarized. The magnet 29 also comprises two oppositely polarized zones 29a and 29b. At their sides facing the control coil 31 the zone 28 is polarized oppositely to the zone 29a and the zone 28b oppositely to 29b, so that the parts of the control coil 31, between the permanent stator magnets are disposed in permanent magnetic fields of opposite polarity. The axial permanent magnetic fields are closed via the two iron end-plates 66 and 67. Instead of integral stator magnets 28 and 29, it is also possible to employ a plurality of separate magnets. As an example, the stator magnet 28 may comprise two parts with the zone 28a belonging to the one stator magnet and the zone 28b to the other stator magnet. The end plates 66 and 67 of the permanent magnetic stator 27 extend transversely of the pivotal axis 13 of the swing arm 14 beyond the bearing pin 54, and the bearing housings 60 and 61 are secured to the stator end-plates 66 and 67 by means of the self-tapping screws 65. Thus, the stator end-plates 66 and 67 also constitute the frame plates for the bearing arrangement 32. In addition to the two stator end-plates 66 and 67, the stator 27 comprises three spacers 68, 69 and 70. By means of three bolts 71, 72 and 73 and associated nuts 74 to 76, the assembly comprising the stator end-plates 66 and 67 and the three spacers 68 to 70 are combined to form a rigid unit constituting the stator frame of the permanent magnetic stator. Since the bearing housings 60 and 61 are secured to said stator frame, the stator frame also constitutes a frame for the complete swing-arm arrangement. The stator end-plate 67 also serves as the base plate by means of which the complete swing-arm arrangement can be mounted on the deck 77 of the magnetic-disc storage apparatus. The means for connecting the swing-arm arrangement 2 to the deck 77 are not shown, but will generally comprise screw means.

The embodiment of the swing-arm arrangement shown in the drawing is equipped with a tacho-coil 78 which is connected to the swing arm 14 and which is movable in a permanent magnetic field in order to generate an induction voltage which is a measure of the speed of pivoting the swing arm 14. For this purpose, permanent tacho-magnets 79 and 80 are arranged on the outer side of the stator end-plate 67. The magnets are magnetized axially and oppositely in the direction of the pivotal axis 13. Instead of two magnets 78, 80, a single flat magnet may be used with zones of opposite polarization. The stator end-plate 67 also serves for closing the axial magnetic fields produced by the two tacho-magnets 79 and 80 on one side. On the inner side of the stator end-plate 67, the bearing pin 54 comprises a free end 81 which extends through an opening 82 in said stator end-plate beyond the outer side thereof. The tacho-coil 78, which is flat like the control 31, is secured to the free end 81 of the bearing pin 54 by means of a nut 83 and can move in a permanent magnet field produced by the tacho-magnets 79 and 80. At some distance from the stator end-plate 67, there is arranged an iron tacho end-plate 84 parallel thereto. The tacho coil 78 moves parallel to the flat tacho magnets 79 and 80 and leaves an air gap between the stator end-plate 67 and the tacho end-plate 84, so that the axial permanent magnetic field of the tacho-magnets is closed by the stator end-plate on one side and the tacho end-plate on the other side. The stator end-plate 84 is secured to the underside of the deck 77 by means of four self-tapping screws 85 to 88, but may alternatively be secured to the stator end plate 67 by means of separate spacer means. The tacho-magnets 79 and 80 as well as the tacho-coil 78 are disposed in a recess 89 of the deck 77.

The two stator end-plates 66 and 67 comprise substantially identical plates which are die-cut from a flat magnetizable sheet material. Thus, they can be manufactured cheaply using simple means and of that only one type of stator end plates need to be manufactured. The requirements imposed on the manufacturing accuracy are not stringent. Therefor after die-cutting, the stator end plates need not be subject to any machining operation. The stator magnets 28 and 29 extend in a direction which is substantially transverse to the direction of pivoting of the control coil 31 slightly beyond the edges of the stator end-plates 66 and 67, respectively; see also FIG. 1.

Figure 4:
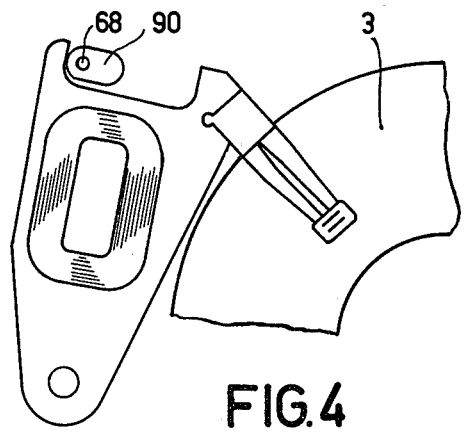
Figure 5:
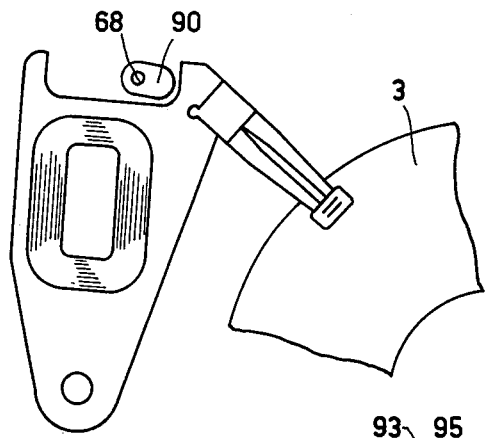
Figure 6:
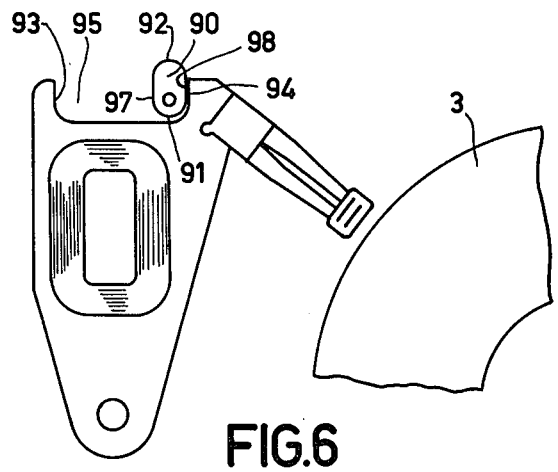

There is provided a stop 90 which, with opposite sides 91 and 92, cooperates with the respective sides 93 and 94 of the wall of a recess 95 in the swing arm 14. The sides 91 and 92 of the stop 90 limit the pivotal movement of the swing arm between a first and a second position. See FIGS. 4 and 5 which represent the swing arm 14 in the first or inner position and the second or outer position, respectively. The stop 90 is made of rubber and is movable between an operating position (FIGS. 4 and 5) and a maintenance position, (FIG. 6) The stop, which is entirely made of elastic rubber, comprises a rotatable stop cam which has a moderately tight fit on the spacer 68. For this purpose, the stop has an opening 96 of a diameter which is slightly smaller than the outer diameter of the spacer 68. The opening is eccentric so that the stop cam is eccentrically rotatable between the operating position and the maintenance position. In the maintenance position the stop cam has been rotated through 90°.

In this maintenance position, the mutually facing sides 93 and 94 of the wall of the recess 95 cooperate with opposite sides 97 and 98 of the stop cam. Said sides are situated nearer each other than the sides 91 and 92 so that, for maintenance purposes, the swing arm 14 can be pivoted through such an extended range that the magnetic heads 9 to 12 will be situated adjacent the surface of the magnetic discs 3 and 4. This position is also employed during assembly of the magnetic disc apparatus to enable the magnetic heads to be mounted on the magnetic disc apparatus without being damaged.

While there has been shown and described what is at present considered the preferred embodiment of the arrangement according to the invention, it will be apparent to those skilled in the art that various changes and modifications may be made therein without departing from the spirit and scope of the invention as defined by the appended claims. As an example, a stop cam may be used which is rotatable about a differently oriented axis or which is slidable instead of rotatable. The recess in the swing arm may be situated nearer the center. Furthermore, the term "recess" should be interpreted in its broadest sense, because it should also apply to embodiments in which a swing arm is provided with projections which extend transversely of the plane of pivoting and which cooperate with the opposite sides of a single stop. Said projections may comprise tabs which are bent out of the material of the swing arm.

What is claimed is:

1. A swing arm arrangement for moving and positioning a magnetic head over a surface of a rigid rotatable magnetic disc of a magnetic disc store for digital data, the arrangement comprising:
    a stationary frame;
    at least one swing arm pivotally mounted to the frame about an axis for movement between a first position and a second position, the arm including an end remote from the pivotal axis and also including a pair of opposed walls connected to the end, the walls having mutually facing sides forming a recess therebetween;
    a magnetic head connected to the arm near the end;
    means for stopping the pivotal movement of the arm at the first and at the second positions, the stop means including a stop connected to the frame and disposed in the recess, the stop having a first pair of opposite sides disposed on a first axis lying in a plane perpendicular to the pivotal axis, the stop sides cooperating with respective wall sides so that the pivotal movement of the arm is stopped at the first and at the second positions.

2. An arrangement as claimed in claim 1, wherein the stop is a unitary member.

3. An arrangement as claimed in claim 1, wherein the stop is formed of an elastic material.

4. An arrangement as claimed in claim 1, wherein the stop also includes a second pair of opposite sides disposed on a second axis oriented generally perpendicular to the first axis, the first pair of sides being separated by a first distance and the second pair of sides being separated by a second distance, the first distance being greater than the second distance.

5. An arrangement as claimed in claim 4, wherein the stop is pivotally mounted to the frame, the stop being pivotal between an operating position and a maintenance position, and a substantially 90° angle separating the operating position from the maintenance position so that the stop is pivotal from the operating position through the angle to the maintenance position.

6. An arrangement as claimed in claim 5, wherein the stop has an eccentric shape.

7. An arrangement as claimed in claim 6, wherein the stop is an elongate unitary member.

8. An arrangement as claimed in claim 5, wherein the frame includes two frame portions disposed in respective parallel planes oriented perpendicular to the pivotal axis, and a spacer is arranged between the frame portions and extends in a direction generally perpendicular to the frame portion planes, the stop having an eccentric opening through which the spacer extends.

* * * * *